US011151714B2

(12) United States Patent
Takahashi et al.

(10) Patent No.: US 11,151,714 B2
(45) Date of Patent: Oct. 19, 2021

(54) ANOMALY DETECTION APPARATUS, ANOMALY DETECTION METHOD, AND COMPUTER-READABLE RECORDING MEDIUM

(71) Applicant: NEC CORPORATION, Tokyo (JP)

(72) Inventors: Katsuhiko Takahashi, Tokyo (JP); Yuichi Nakatani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 16/651,649

(22) PCT Filed: Sep. 29, 2017

(86) PCT No.: PCT/JP2017/035746
§ 371 (c)(1),
(2) Date: Mar. 27, 2020

(87) PCT Pub. No.: WO2019/064599
PCT Pub. Date: Apr. 4, 2019

(65) Prior Publication Data
US 2020/0311894 A1    Oct. 1, 2020

(51) Int. Cl.
*G06K 9/46* (2006.01)
*G06T 7/00* (2017.01)

(52) U.S. Cl.
CPC .... *G06T 7/001* (2013.01); *G06T 2207/20081* (2013.01)

(58) Field of Classification Search
CPC ........... G06T 7/001; G06T 2207/30148; G06T 7/0002; G06T 2207/10061;
(Continued)

(56) References Cited

U.S. PATENT DOCUMENTS

2003/0007691 A1* 1/2003 Adachi .............. G06K 9/00154
382/219
2009/0222753 A1   9/2009 Yamaguchi et al.
(Continued)

FOREIGN PATENT DOCUMENTS

JP          07-21380 A     1/1995
JP       2009-210309 A     9/2009
(Continued)

OTHER PUBLICATIONS

Richard Hartley, et al., "Multiple View Geometry in Computer Vision Second Edition", Cambridge University Press, 2004, p. 91.
(Continued)

*Primary Examiner* — Quan M Hua
(74) *Attorney, Agent, or Firm* — Sughrue Mion, PLLC

(57) ABSTRACT

An anomaly detection apparatus 100 includes an image transformation unit 103 that calculates an image transformation parameter, based on an inspection image in which an inspection object appears, a reference image indicating a normal state of the inspection object and a parameter for image transformation parameter calculation, and performs image transformation on the inspection image using the image transformation parameter, an image change detection unit 104 that collates the reference image and the image-transformed inspection image using a change detection parameter, and calculates an anomaly certainty factor indicating whether there is a change in a specific region of the inspection image, a change detection parameter learning unit 106 that learns the change detection parameter, based on a difference between a training image indicating a correct answer value of the change and the anomaly certainty factor, and an image transformation parameter learning unit 108 that learns the parameter for image transformation parameter calculation, based on a collection amount derived from the difference between the training image and the anomaly (Continued)

certainty factor and to be applied to the inspection image that has undergone image transformation.

12 Claims, 11 Drawing Sheets

(58) Field of Classification Search
CPC . G06T 2207/30144; G06T 2207/10024; G06T 2207/10056; G06T 2207/20081; G06T 2207/30141; G06T 2207/30168; G06T 2207/10116; G06T 2207/20021; G06T 2207/20036; G06T 5/50; G06T 7/50; G06T 7/60; G06T 2207/10008; G06T 2207/20076; G06T 2207/30108; G06T 5/002; G06T 5/005; G06T 7/254; G06T 2207/20084; G06T 2207/30004; G06T 2207/30201; G06T 2207/30216; G06T 5/008; G06T 7/0008; G06T 7/90; G06T 7/97; G06T 2207/10004; G06T 2207/20024; G06T 7/0006; G06T 7/194; G06T 7/246; G06T 7/337; G06T 7/62; G06T 2207/10028; G06T 2207/20008; G06T 2207/20016; G06T 2207/20092; G06T 2207/30136; G06T 7/0004; G06T 7/11; G06T 7/30; G06T 7/35; G01N 21/956; G01N 21/94; G01N 2021/8887; G01N 2021/8864; G01N 2223/052; G01N 2223/1016; G01N 2223/0566; G06K 9/6202; G06K 2209/19; G06K 9/66; G06K 5/02; G06K 9/036; G06K 9/62; G06K 2209/01; H04N 1/0005; H04N 1/00029; H04N 1/00737; H04N 1/00002; H04N 1/00047
See application file for complete search history.

(56) References Cited

U.S. PATENT DOCUMENTS

2013/0301070 A1* 11/2013 Saisho ............... H04N 1/32358
358/1.13
2014/0071228 A1*  3/2014 Cho ................... H04N 5/23238
348/36

FOREIGN PATENT DOCUMENTS

JP        2012-032370 A     2/2012
JP        2014-126445 A     7/2014

OTHER PUBLICATIONS

Angjoo Kanazawa, et al., "WarpNet: Weakly Supervised Matching for Single-view Reconstruction", University of Maryland, College Park, Jun. 20, 2016, 9 pages.
International Search Report for PCT/JP2017/035746 dated Dec. 12, 2017 (PCT/ISA/210).
Written Opinion dated Dec. 12, 2017, from the International Searching Authority in International Application No. PCT/JP2017/035746.

* cited by examiner

ANOMALY DETECTION APPARATUS, ANOMALY DETECTION METHOD, AND COMPUTER-READABLE RECORDING MEDIUM

CROSS REFERENCE TO RELATED APPLICATIONS

This application is a National Stage of International Application No. PCT/JP2017/035746 filed Sep. 29, 2017, the disclosure of which is incorporated herein in its entirety by reference.

TECHNICAL FIELD

The present invention relates to an anomaly detection apparatus and au anomaly detection method that are for detecting anomalies in an object by collating a reference image and an inspection image that are shot of the object, and furthermore relates to a computer-readable recording medium that includes a program recorded thereon for realizing the apparatus and method.

BACKGROUND ART

Heretofore, apparatuses whose object is to automatically detect anomalies that are evident from the outward appearance of industrial components, infrastructural structures and the like using images have been proposed. Such apparatuses map a reference image shot of the object in a normal state and an inspection image shot of the object at the time of inspection, and detect anomalies from the difference therebetween. Also, such apparatuses execute anomaly detection after having performed position transformation (alignment), in the case where the position of the object in the inspection image differs from the position of the object in the reference image (e.g., refer to Patent Document 1).

Specifically, Patent Document 1 discloses a defect detection apparatus that detects defects using a reference image (model image) and an inspection image (input image). The defect detection apparatus disclosed in Patent Document 1 maps the reference image and the inspection image, based on feature points that are respectively extracted therefrom, transforms the coordinate systems of both images into a common coordinate system, and thereafter detects defects by deriving the difference between both images.

Also, although not a technology for detecting anomalies, Patent Document 2 discloses a technology for aligning two images. With the technology disclosed in Patent Document 2, alignment is performed by extracting edges from a reference image (first image) and an inspection image (second image), and estimating position transformation such that the feature amounts of the edges extracted from the respective images are similar to each other.

Incidentally, with the apparatus disclosed in Patent Document 1 or the technology disclosed in Patent Document 2, in the case where a large difference caused by an anomaly or a large change in luminance arises between the two images, a situation could possibly arise in which local feature amounts of one image with respect to feature points of the other image do not coincide at corresponding points. In the abovementioned case, a situation could also possibly arise in which the correspondence relationship of pixels from one image to the other image is more complex than the level that can be represented by affine transformation or homography, such as a situation where the correspondence relationship is represented by a nonlinear transformation, for example. Alignment is difficult in the case where these situations arise.

Accordingly, in anomaly detection using images, it is conceivably desirable to enable alignment by feature points that is disclosed in Patent Document 1 and alignment by edges that is disclosed in Patent Document 2 to be used in combination.

However, it is actually difficult to use the alignment that is disclosed in Patent Document 1 in combination with the alignment that is disclosed in Patent Document 2. This is because the evaluation criteria of whether images coincide are different in both, and the alignment accuracy cannot be enhanced simply by using the features of both in combination. The reasons for this will be specifically described below.

First, with alignment that is based on feature points, generally, after mapping feature points between two images, an equation with a parameter for alignment as a variable is created for every group of corresponding points that correspond, and the parameter for alignment is analytically derived by solving a simultaneous equation by a least-squares method or the like. The solution for a homography matrix using the DLT algorithm that is described in Non-Patent Literature 1 is given as a typical example.

On the other hand, with alignment that is based on edges, the transformation parameter cannot be derived with a solution that solves a simultaneous equation. Therefore, with alignment that is based on edges, as described in paragraph [0018] of Patent Document 2, it is necessary for an edge image extracted from one of the images to actually be deformed and superimposed on an edge image of the other image, and for a transformation parameter that reduces the difference between the edge images to be derived through trial and error.

In this way, the alignment that is disclosed in Patent Document 1 and the alignment that is disclosed in Patent Document 2 employ completely different methods of estimating the transformation parameter, and it is difficult to extend these techniques to perform alignment that uses both feature points and edges.

In contrast, Non-Patent Literature 2 discloses an image transformation method that derives position transformation that reduces the difference between the image feature amount of a reference image and the image feature amount of an inspection image, and transforms the coordinate system of each image into a common coordinate system, based on the derived position transformation. Also, with the image transformation method disclosed in Non-Patent Literature 2, various feature amounts effective in image recognition can be learned in advance, without being limited to feature points or edges, and the coordinate systems can be transformed using the learned feature amounts. Thus, with the technique disclosed in Non-Patent Literature 2, there is a possibility of being able to perform alignment that uses various features effective in image recognition such as feature points and edges in combination.

LIST OF RELATED ART DOCUMENTS

Patent Document

Patent Document 1: Japanese Patent Laid-Open Publication No. 2012-032370

Patent Document 2: Japanese Patent Laid-Open Publication No. 2014-126445

Non-Patent Document

Non-Patent Document 1: Richard Hartley, Andrew Zisserman, "Multiple View Geometry in Computer Vision Second Edition" [online], Cambridge University Press, 2004, p. 91, Algorithm 4.1, Internet <URL:. http://cvrs.whu.edu.cn/downloads/ebooks/Multiple % 20View % 20Geometry % 20in % 20Computer % 20Vision % 20(Second % 20Edition).pdf>

Non-Patent Document 2: Angjoo Kanazawa, David W. Jacobs, Manmohan Chandraker, "WarpNet: Weakly Supervised Matching for Single-view Reconstruction" [online], University of Maryland, College Park, 20 Jun. 2016, Internet <URL: https://arxiv.org/abs/1604.05592>

SUMMARY OF INVENTION

Problems to be Solved by the Invention

Here, an anomaly detection apparatus that detects anomalies is envisaged, by combining the alignment technology that is shown in Non-Patent Literature 2 and a discriminator that has learned to detect anomalies from an image pair aligned in advance, using an existing pattern recognition technology that is known today. Note that a support vector machine, deep learning and Ada-boost are given as examples of existing pattern recognition technologies. According to such an anomaly detection apparatus, there is a possibility of being able to utilize various features in alignment.

However, since the features that can be utilized are not limited to features suitable for anomaly detection, it may not be possible to perform highly accurate anomaly detection, even with such an anomaly detection apparatus. This is because the transformation parameter in Non-Patent Literature 2 is learned such that points that intrinsically correspond are mapped, but features suitable for anomaly detection are not optimized. In other words, pixels that do not correspond to each other are included in a pair of images that include an anomalous place, but when the transformation parameter is merely learned such that points that intrinsically correspond are mapped, there is uncertainty about how to map pixels that do not correspond to each other.

For example, there is a possibility of superfluous image transformation that conceals anomalous places being executed, in which case, anomaly detection will be difficult. Conversely, there is also a possibility of erroneous mapping caused by a difference in luminance values being performed on an inspection image that is merely hit by light differently and is not anomalous. Such a situation arises from information indicating whether a difference between the inspection image and the reference image is due to an anomaly that is desirably detected not being used in learning the parameter for alignment.

An example object of the invention is to provide an anomaly detection apparatus, an anomaly detection method and a computer-readable recording medium that enable highly accurate anomaly detection, by simultaneously optimizing a parameter for image transformation suitable for anomaly detection and a parameter for identifying whether an image that has undergone image transformation is anomalous or normal.

Means for Solving the Problems

An anomaly detection apparatus according to an example aspect of the invention is for detecting an anomaly in an inspection object, using an inspection image in which the inspection object appears and a reference image showing a normal state of the inspection object, the apparatus including:

an image transformation unit configured to calculate an image transformation parameter, based on the inspection image, the reference image and a parameter for image transformation parameter calculation, and perform image transformation on the inspection image, using the calculated image transformation parameter, such that the inspection object in the inspection image overlaps with the inspection object in the reference image;

an image change detection unit configured to collate the reference image and the inspection image that has undergone image transformation, using a change detection parameter, and calculate an anomaly certainty factor indicating whether there is a change in a specific region of the inspection image;

a change detection parameter learning unit configured to learn the change detection parameter, based on a difference between a training image indicating a correct answer value of the change in the specific region and the anomaly certainty factor calculated by the image change detection unit; and an image transformation parameter learning unit configured to learn the parameter for image transformation parameter calculation, based on a correction amount derived from the difference between the training image and the anomaly certainty factor calculated by the image change detection unit and to be applied to the inspection image that has undergone image transformation.

Also, an anomaly detection method according to an example aspect of the invention is for detecting an anomaly in an inspection object, using an inspection image in which the inspection object appears and a reference image showing a normal state of the inspection object, the method including:

(a) a step of calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

(b) a step of collating the reference image and the inspection image that has undergone image transformation, using a change detection parameter, and calculating an anomaly certainty factor indicating whether there is a change in a specific region of the inspection image;

(c) a step of learning the change detection parameter, based on a difference between a training image indicating a correct answer value of the change in the specific region and the anomaly certainty factor calculated in the (b) step; and (d) a step of learning the parameter for image transformation parameter calculation, based on a correction amount derived from the difference between the training image and the anomaly certainty factor calculated in the (b) step and to be applied to the inspection image that has undergone image transformation.

Furthermore, a computer-readable recording medium according to an example aspect of the invention includes a program recorded thereon for detecting, by computer, an anomaly in an inspection object, using an inspection image in which the inspection object appears and a reference image showing a normal state of the inspection object, the program including instructions that cause the computer to carry out:

(a) a step of calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

(b) a step of collating the reference image and the inspection image that has undergone image transformation, using a change detection parameter, and calculating an anomaly certainty factor indicating whether there is a change in a specific region of the inspection image;

(c) a step of learning the change detection parameter, based on a difference between a training image indicating a correct answer value of the change in the specific region and the anomaly certainty factor calculated in the (b) step; and (d) a step of learning the parameter for image transformation parameter calculation, based on a correction amount derived from the difference between the training image and the anomaly certainty factor calculated in the (b) step and to be applied to the inspection image that has undergone image transformation.

Advantageous Effects of the Invention

According to the invention as described above, highly accurate anomaly detection becomes possible, by simultaneously optimizing a parameter for image transformation suitable for anomaly detection and a parameter for identifying whether an image that has undergone image transformation is anomalous or normal.

EXAMPLE EMBODIMENTS

First Example Embodiment

Hereinafter, an anomaly detection apparatus, an anomaly detection method and a program according to a first example embodiment of the invention will be described, with reference to FIGS. 1 to 8.

Apparatus Configuration

Figure 1:
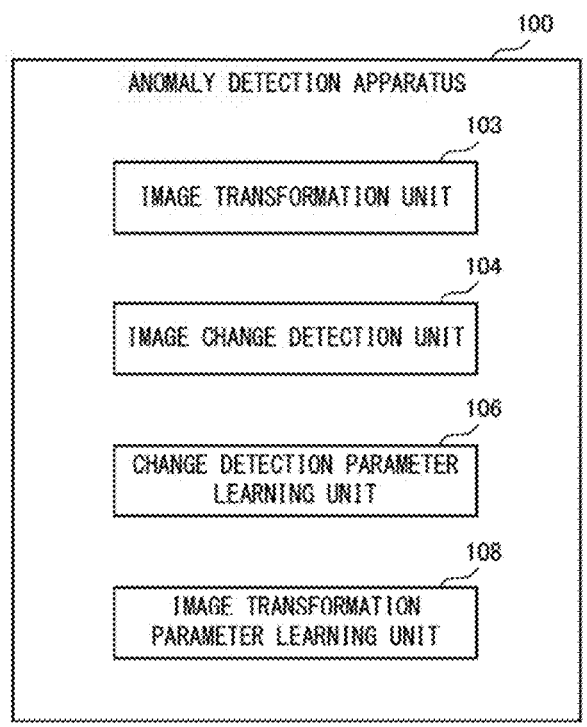
FIG. 1 is a block diagram showing a schematic configuration of an anomaly detection apparatus in a first example embodiment of the invention.

Initially, a configuration of the anomaly detection apparatus according to the first example embodiment will be described using FIG. 1. FIG. 1 is a block diagram showing a schematic configuration of the anomaly detection apparatus according to the first example embodiment of the invention.

An anomaly detection apparatus 100 according to the first example embodiment shown in FIG. 1 is for detecting anomalies in an inspection object, using an inspection image in which the inspection object appears and a reference image showing a normal state of the inspection object. As shown in FIG. 1, the anomaly detection apparatus 100 is provided with an image transformation unit 103, an image change detection unit 104, a change detection parameter learning unit 106, and an image transformation parameter learning unit 108.

The image transformation unit 103 calculates an image transformation parameter, based on the inspection image, the reference image and a parameter for image transformation parameter calculation, and performs image transformation on the inspection image, using the calculated image transformation parameter, such that the inspection object in the inspection image overlaps with the inspection object in the reference image.

The image change detection unit 104 calculates an anomaly certainty factor indicating whether there is a change in a specific region of the inspection image, by collating the inspection image that has undergone image transformation with the reference image using a change detection parameter.

The change detection parameter learning unit 106 learns the change detection parameter, based on the difference between a training image indicating a correct answer value of the change in the specific region and the anomaly certainty factor calculated by the image change detection unit 104.

The image transformation parameter learning unit 108 learns the parameter for image transformation parameter calculation, based on a correction amount derived from the difference between the training image and the anomaly certainty factor calculated by the image change detection unit 104 and to be applied to the inspection image that has undergone image transformation.

In this way, in the first example embodiment, the anomaly detection apparatus, through learning using a training image, simultaneously optimizes the parameter (image transformation parameter) for image transformation suitable for anomaly detection and the parameter (change detection parameter) for identifying whether an image that has undergone image transformation is anomalous or normal. Thus, according to the first example embodiment, highly accurate anomaly detection becomes possible.

Figure 2:
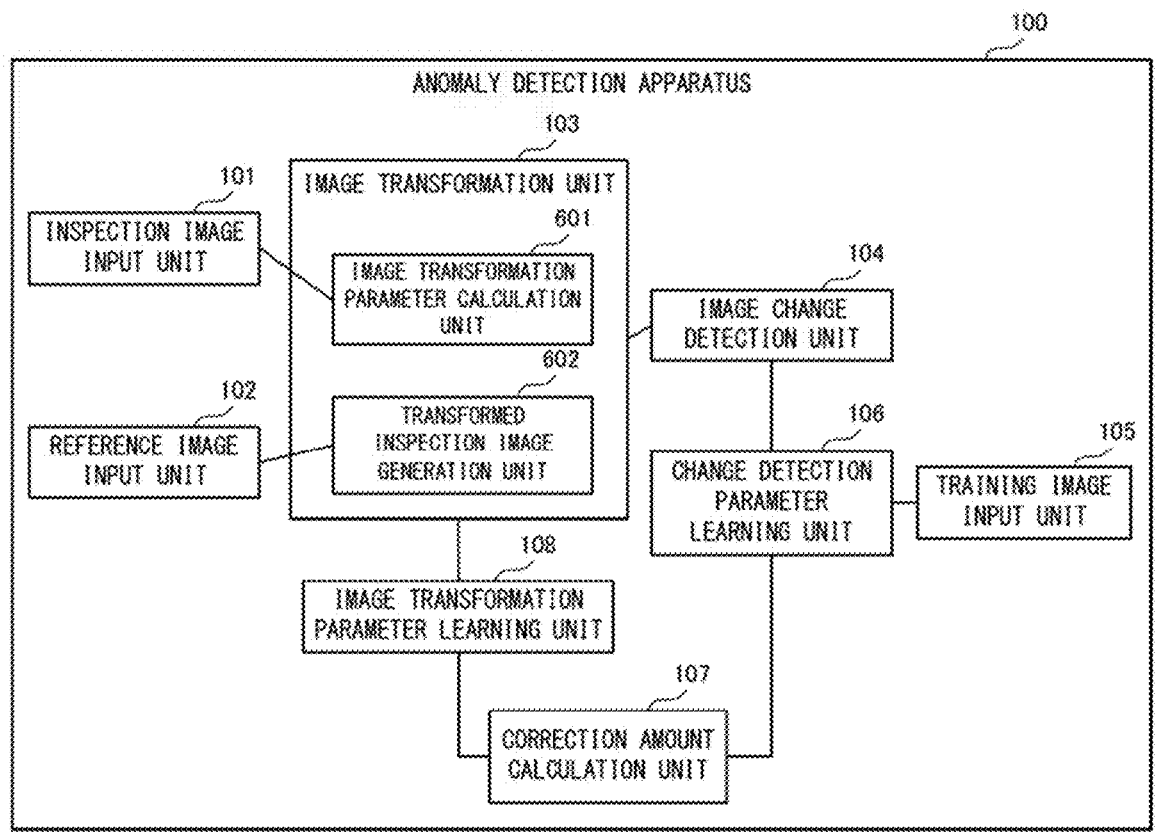
FIG. 2 is a block diagram showing a specific configuration of the anomaly detection apparatus according to the first example embodiment of the invention.

Next, the configuration of the anomaly detection apparatus according to the first example embodiment will be more specifically described using FIGS. 2 to 6. FIG. 2 is a block diagram showing a specific configuration of the anomaly detection apparatus according to the first example embodiment of the invention.

As shown in FIG. 2, in the first example embodiment, the anomaly detection apparatus 100 is further provided with an inspection image input unit 101, a reference image input unit 102, a training image input unit 105 and a correction amount calculation unit 107, in addition to the configuration shown in FIG. 1.

Also, in the first example embodiment, the anomaly detection apparatus operates in two operational modes, namely, a learning mode for learning respective parameters and an anomaly detection mode for detecting anomalies in an inspection object. Therefore, first, the units from the inspection image input unit 101 to the image change detection unit 104 that function in both modes will be specifically described.

Figure 3:
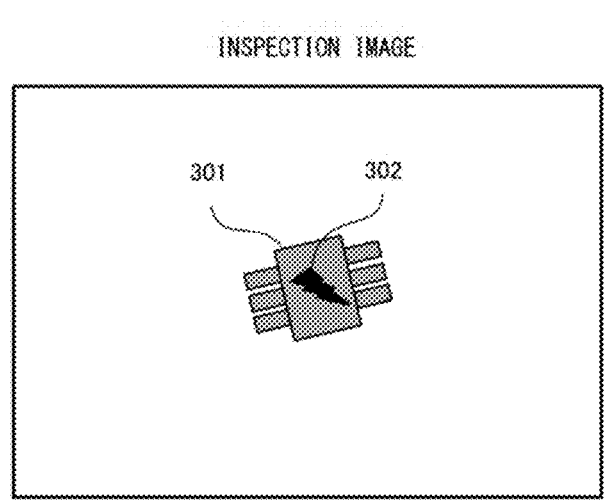
FIG. 3 is a diagram showing an example of an inspection image that is used in example embodiments of the invention.

The inspection image input unit 101 acquires an inspection image from outside, and inputs the acquired inspection image to the image transformation unit 103. The inspection image is an image obtained by shooting an inspection object with an image capturing apparatus. Also, the inspection image may be a color image, or may be a luminance image, a far-infrared image, or the like. FIG. 3 is a diagram showing an example of the inspection image that is used in the example embodiments of the invention. In the example in FIG. 3, the inspection object is a component 301 that has a flaw 302. Also, in the example in FIG. 3, the inspection image is a luminance image. Furthermore, in the inspection image shown in FIG. 3, the component 301 serving as the inspection object has turned a few degrees counterclockwise.

Figure 4:
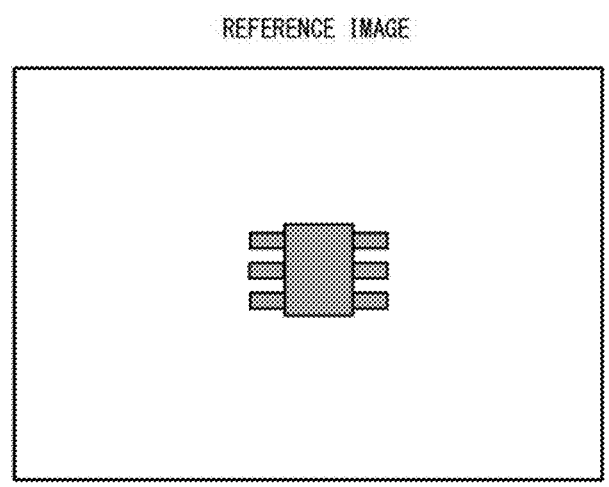
FIG. 4 is a diagram showing an example of a reference image that is used in example embodiments of the invention.

The reference image input unit 102 acquires a reference image from outside, and inputs the acquired reference image to the image transformation unit 103. The reference image is an image that is used for comparison with the inspection image, and, as described above, represents a normal state of the inspection object. Also, the reference image is basically the same type of image as the inspection image. FIG. 4 is a diagram showing an example of the reference image that is used in the example embodiments of the invention. In the example in FIG. 4, the component 301 in a normal state appears as the object.

Also, as shown in FIGS. 3 and 4, the position and orientation within the image may differ between the inspection object that appears in the reference image and the inspection object that appears in the inspection image, due to differences in the relative positional relationship with the camera at the time of shooting the respective images. Differences in positon and orientation are resolved through image transformation of the inspection image by the image transformation unit 103.

The image transformation unit 103, as described above, performs image transformation on the inspection image, such that the inspection object in the inspection image overlaps with the inspection object in the reference image. Also, as shown in FIG. 2, in the first example embodiment, the image transformation unit 103 is broadly provided with an image transformation parameter calculation unit 601 that calculates the image transformation parameter and a transformed inspection image generation unit 602 that transforms the inspection image based on the image transformation parameter calculated by the image transformation parameter calculation unit 601 and generates a transformed inspection image.

The image transformation parameter calculation unit 601 calculates the image transformation parameter, based on the reference image, the inspection image and the parameter for image transformation parameter calculation that is held at the image transformation unit 103. Hereinafter, the image transformation parameter will be specifically described using mathematical equations.

The image transformation parameter is, in the case where scaling is assumed, for example, represented by a set of four parameters, namely, an enlargement factor relating to an x-axis direction, an enlargement factor relating to a y-axis direction, a center x-coordinate of scale transformation, and also a center y-coordinate of scale transformation. For example, in the case where affine transformation is assumed, an image transformation parameter $\theta_{ij}$ is represented by six parameters $\{\theta_{11}, \theta_{12}, \theta_{13}, \theta_{21}, \theta_{22}, \theta_{23}\}$ corresponding to the following equation 1.

$$\begin{pmatrix} x' \\ y' \end{pmatrix} = \begin{pmatrix} \theta_{11} & \theta_{12} & \theta_{13} \\ \theta_{21} & \theta_{22} & \theta_{23} \end{pmatrix} \begin{pmatrix} x \\ y \end{pmatrix} \qquad \text{[Equation 1]}$$

Also, the image transformation parameter $\theta_{ij}$ is calculated by the following equation 2, using a reference image $I_R$, an inspection image I, and a parameter $\omega_1$ for image transformation parameter calculation.

$$\theta_{ij} = f_{ij}^{-1}(I, I_R, \omega_1) \qquad \text{[/Equation 2]}$$

In the above equation 2, a function $f_{ij}^{-1}$ is partially differentiable with respect to $\omega_1$. For example, in the case where the function $f_{ij}^{-1}$ is constituted by a neural network whose inputs are pixel values of the reference image $I_R$ and the inspection image I, a weight parameter thereof may be set to $\omega_1$.

Figure 5:
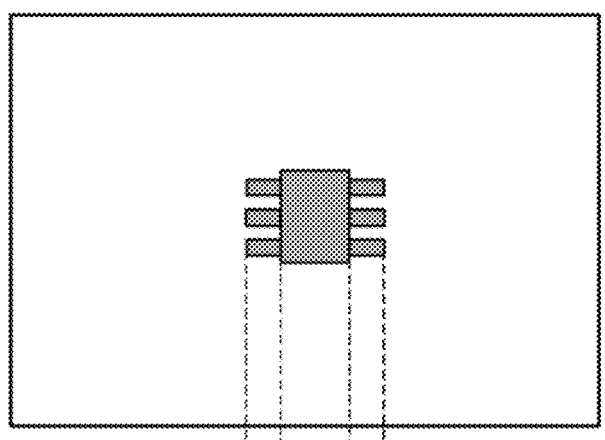
FIG. 5 is a diagram showing an example of an inspection image that has undergone image transformation and a reference image in example embodiments of the invention.
Figure 5:
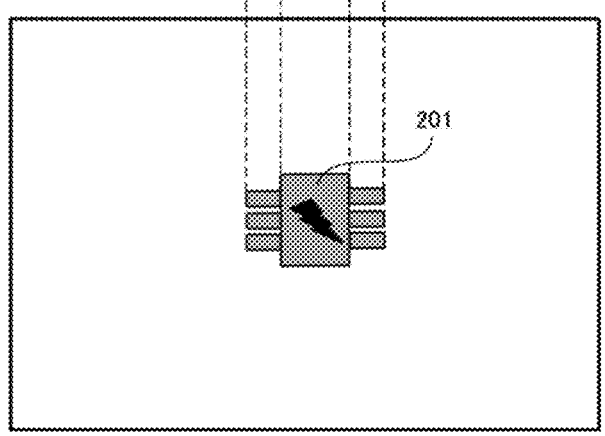

Also, the transformed inspection image generation unit 602 executes image transformation on the inspection image, based on the calculated image transformation parameter, when the image transformation parameter has been calculated. Here, the transformed inspection image is denoted as a transformed inspection image $I_T$. As shown in FIG. 5, the position and orientation of the component 301 in the inspection image have been corrected through image transformation, and are aligned with the position and orientation of the component 301 in the reference image. FIG. 5 is a diagram showing an example of the inspection image that has undergone image transformation and the reference image in the example embodiments of the invention.

Note that, in the first example embodiment, the image transformation by the transformed inspection image generation unit 602 is not transformation using a fixed parameter value. A feature of the first example embodiment is that the transformation parameter changes depending on the contents of the reference image $I_R$ and the inspection image I.

The image change detection unit 104 calculates an anomaly certainty factor, by applying the change detection parameter that is stored therein to the transformed inspection image that is output by the image transformation unit 103 and the reference image that is output by the reference image input unit 102.

The anomaly certainty factor, as described above, indicates whether there a change in a specific region of the inspection image. More specifically, the anomaly certainty factor is a numerical value $D_k$ indicating, for every pixel or every small region constituting the inspection image, the probability that an anomalous change has occurred, and is calculated with the following equation 3. Also, the anomaly certainty factor is a set of the numerical values $D_k$ for every pixel or every small region, and is also constituted as an image indicating an anomalous change. Hereinafter, an image constituted by a set of anomaly certainty factors will be denoted as an "anomaly certainty factor image".

$$D_k = f_k^2(I_T, I_R, \omega_2) \qquad \text{[Equation 3]}$$

In the above equation 3, function $f_{k2}$ indicates a function for calculating the anomaly certainty factor value of a kth pixel in the anomaly certainty factor image, and $\omega_2$ indicates the change detection parameter. The function $f_k^2$ is partially differentiable with respect to the change detection parameter $\omega_2$ and the transformed inspection image $I_T$. Also, the function $f_{k2}$ may be constituted using a neural network such as a convolutional neural network, for example.

Figure 6:
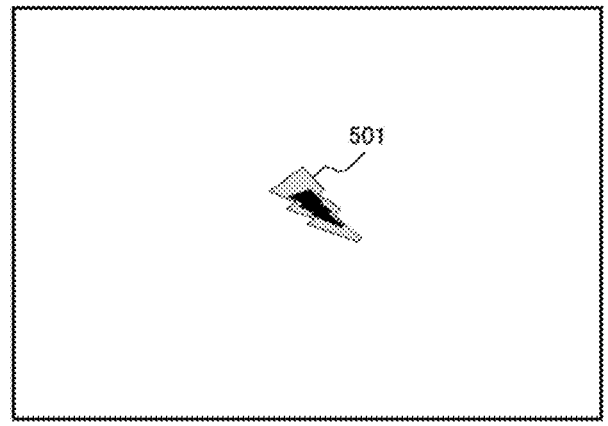
FIG. 6 is a diagram showing an example of an anomaly certainty factor image that is obtained in example embodiments of the invention.

The anomaly certainty factor image obtained from the reference image and inspection image shown in FIG. 5 is shown in FIG. 6. FIG. 6 is a diagram showing an example of the anomaly certainty factor image that is obtained in the example embodiments of the invention. In the example in FIG. 6, the portion colored in white indicates a region constituted by pixels whose anomaly certainty factor approximates 0 (minimum value). Also, the portion colored in black indicates a region constituted by pixels whose anomaly certainty factor approximates 1 (maximum value). Furthermore, the portion colored in gray indicates a region constituted by pixels whose anomaly certainty factor is an intermediate value between 0 and 1. Also, as evident from FIG. 6, the output of the image change detection unit 104 is more a set of scalar values holding position information than scalar values not including position information. In FIG. 6, reference numeral 501 indicates the portion where an anomaly has occurred.

Next, the units from the training image input unit 105 to the image transformation parameter learning unit 108 that function only in the learning mode will be specifically described.

The training image input unit 105 acquires a training image from outside, and inputs the acquired training image to the change detection parameter learning unit 106. The training image is an image indicating a correct answer value of a change in a specific region as described above, and, specifically, is a set of ideal output values for the anomaly certainty factor image (two-dimensional anomaly certainty factor values) that is output by the image change detection unit 104. For example, in correspondence with the certainty factor image shown in FIG. 6, an image in which the value of pixels constituting the entire graphic corresponding to the anomaly, that is, the inner and contour portions, is "1" and the value of pixels constituting the remaining portion is "0" is given as an example of an ideal training image.

The change detection parameter learning unit 106, in this example embodiment, first calculates the sum of squares (denoted as S) of the difference between the training image input from the training image input unit 105 and the anomaly certainty factor image calculated by the image change detection unit 104. Next, the change detection parameter learning unit 106 corrects the change detection parameter $\omega_2$ that is stored in the image change detection unit 104, such that the sum of squares S becomes smaller than the current state.

As is evident from the abovementioned equation 3, the equation for calculating S is represented by the change detection parameter $\omega_2$ and the function $D_k$ that is partially differentiable with respect to the transformed inspection image $I_T$ serving as input data. Thus, in the first example embodiment, it is possible to correct the change detection parameter $\omega_2$ and the transformed inspection image $I_T$ such that S decreases using a steepest descent method. Accordingly, the change detection parameter learning unit 106 corrects the change detection parameter with the following equation 4.

$$\omega_2 \leftarrow \omega_2 - \varepsilon_2 \frac{\partial S}{\partial \omega_2} \qquad \text{[Equation 4]}$$

Here, $\varepsilon_2$ is a constant that controls the correction amount of one correction. The value of the corrected change detection parameter is stored. Such a parameter correction method is also used with a back propagation method in a convolutional neural network.

The correction amount calculation unit 107 calculates the correction amount to be applied to the inspection image that has undergone image transformation, such that the difference between the training image and the anomaly certainty factor calculated by the image change detection unit 104 decreases. Specifically, the correction amount calculation unit 107 calculates a correction amount $D_T$ of the image-transformed inspection image $I_T$ with the following equation 5, such that the sum of squares S of the difference between the training image input from the training image input unit 105 and the anomaly certainty factor image calculated by the image change detection unit 104 decreases.

$$D_T = -\varepsilon_2 \frac{\partial S}{\partial I_T} \qquad \text{[Equation 5]}$$

$D_T$ is an amount of change that is respectively obtained for each pixel or some of the pixels of the image-transformed inspection image $I_T$. The correction amount calculation unit 107 outputs the calculated $D_T$ to the image transformation parameter learning unit 108.

The image transformation parameter learning unit 108 corrects and updates the parameter for image transformation parameter calculation that is stored in the image transformation unit 103, such that the correction amount of the image-transformed inspection image approaches the correction amount $D_T$ input from the correction amount calculation unit 107.

Specifically, the image transformation parameter learning unit 108 first calculates the amount of movement of the transformed inspection image in the x-axis direction and in the y-axis direction so as to realize the correction amount (i.e., increase or decrease that depends on the rate by which the pixel values are to be increased or decreased) input from the correction amount calculation unit 107. This can be realized by respectively deriving the differential in the x-axis direction and the differential in the y-axis direction on the transformed inspection image.

Next, the image transformation parameter learning unit 108 derives the parameter $\omega_1$ for image transformation parameter calculation that is calculated with respect to various pixel positions and realizes the amount of movement in the x-axis direction and in the y-axis direction of the transformed inspection image by the least-squares method. As mentioned in the description of the image transformation unit 103, the amount of movement in the x-axis and y-axis directions (x-x', y-y') and the parameter $\omega_1$ for image transformation parameter calculation are related. Accordingly, the update amount of the parameter $\omega_1$ for image transformation parameter calculation can be readily calculated (refer to the following reference document). Also, the image transformation parameter learning unit 108 passes the derived parameter $\omega_1$ for image transformation parameter calculation to the image transformation unit 103 to be stored.

Reference Document: Spatial Transformer Networks, Max Jaderberg, Karen Simonyan, Andrew Zisserman, Koray Kavakcouglu, Equations (7) and (10), https://arxiv.org/abs/1506.02025

Apparatus Operations

Next, operations of the anomaly detection apparatus 100 according to the first example embodiment of the invention will be described using FIGS. 7 and 8. In the following description, FIGS. 1 to 6 are taken into consideration as appropriate. Also, in the first example embodiment, the anomaly detection method is implemented by operating the anomaly detection apparatus 100. Therefore, the following description of the operations of the anomaly detection apparatus 100 is given in place of a description of the anomaly detection method according to the first example embodiment.

Initially, the case where the anomaly detection apparatus 100 operates in the learning mode will be described using FIG. 7. FIG. 7 is a flowchart showing operations in the learning mode by the anomaly detection apparatus according to the first example embodiment of the invention.

Figure 7:
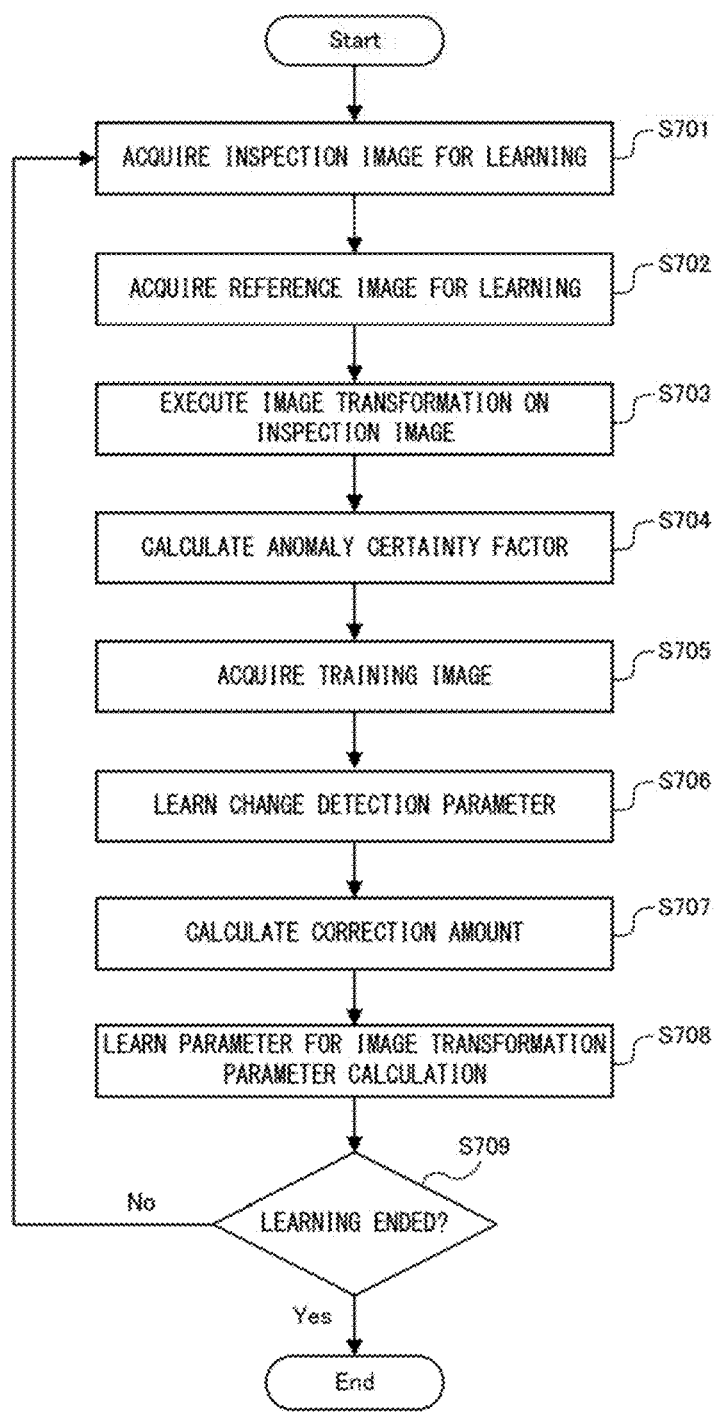
FIG. 7 is a flowchart showing operations in a learning mode by the anomaly detection apparatus according to the first example embodiment of the invention.

As shown in FIG. 7, first, the inspection image input unit 101 acquires an inspection image for learning, and inputs the acquired inspection image to the image transformation unit 103 (step S701). Next, the reference image input unit 102 acquires a reference image for learning, and inputs the acquired reference image to the image transformation unit 103 (step S702).

Note that, in the learning mode, the inspection image that is acquired in step S701 and the reference image that is acquired in step S702 need not be limited to a specific image, and various images may be used as these images.

Next, the image transformation unit 103 calculates the transformation parameter, using the inspection image for learning, the reference image for learning and the parameter for transformation parameter calculation that is currently held, and, furthermore, executes image transformation on the inspection image for learning based on the calculated transformation parameter (step S703). A transformed inspection image to be used in learning is thereby generated.

Next, the image change detection unit 104 collates the transformed inspection image generated in step S703 with the reference image, using the change detection parameter at the current point in time, and calculates the anomaly certainty factor for every specific region (specifically, every pixel) (step S704).

Next, the training image input unit 105 acquires a training image, and inputs the acquired training image to the change detection parameter learning unit 106 (step S705). The training image that is acquired in step S705 is a set of ideal anomaly certainty factor values for every pixel with respect to a group of an inspection image and reference image for learning.

Next, the change detection parameter learning unit 106 derives the difference between the anomaly certainty factor calculated in step S704 and the training image (ideal anomaly certainty factor) acquired in step S705, and learns the change detection parameter, based on the derived difference (step S706).

Specifically, the change detection parameter learning unit 106 calculates the update amount of the change detection parameter that is stored in the image change detection unit 104, such that the sum of squares (square error) of the derived difference becomes smaller than the current state, and updates the change detection parameter, using the calculated update amount.

Next, the correction amount calculation unit 107 derives the difference between the anomaly certainty factor calculated in step S704 and the training image (ideal anomaly certainty factor) acquired in step S705. Next, the correction amount calculation unit 107 calculates the correction amount (amount of change in pixel value) for the image-transformed inspection image for learning that is input to the image change detection unit 104, such that the sum of squares (square error) of the derived difference decreases below the current state (step S707). Also, the correction amount calculation unit 107 outputs the calculated correction amount to the image transformation parameter learning unit 108.

Next, the image transformation parameter learning unit 108 derives, for every pixel, the amount of movement in the x-axis direction and in the y-axis direction that cause a change in each pixel value in the image-transformed inspection image for learning. The image transformation parameter learning unit 108 then updates and learns the parameter $\omega_1$ for image transformation parameter calculation stored in the image transformation unit 103, such that the derived amount of movement occurs (step S708).

Thereafter, the image transformation parameter learning unit 108 determines whether the learning processing has ended (step S709). If the result of the determination of step S709 indicates that the learning processing has not ended, step S701 is executed again. On the other hand, if the result of the determination of step S709 indicates that the learning processing has ended, the learning processing ends.

The abovementioned processing from step S701 to step S708 may be executed for every group of a training image, a reference image and an inspection image for learning. Also, in accordance with a technique called mini-batching, first, the processing from step S701 to step S704 may be executed for group data of a predetermined number of training images, reference images and inspection images for learning. In this case, thereafter, a value obtained by accumulating the square error of the anomaly certainty factor and the ideal anomaly certainty factor for each data group may be calculated, and the processing from steps S705 to S708 may be executed once, based on the obtained cumulative value of square errors.

Also, the abovementioned processing from steps S701 to S708 may be repeatedly executed a predetermined number of times, or may be repeatedly executed until the error is less than or equal to a threshold. The parameter for image transformation parameter calculation stored in the image transformation unit 103 and the change detection parameter stored in the image change detection unit 104 after the processing of these steps has been repeatedly executed will be the learning result that is finally output in the learning mode.

Next, the case where the anomaly detection apparatus 100 operates in the anomaly detection mode using FIG. 8 will be described. FIG. 8 is a flowchart showing operations in the anomaly detection mode by the anomaly detection apparatus according to the first example embodiment of the invention.

The anomaly detection mode is executed by the inspection image input unit 101, the reference image input unit 102, the image transformation unit 103, and the image change detection unit 104. Also, in the anomaly detection mode, the parameter for transformation parameter calculation and the change detection parameter that were generated in the learning mode are used, and anomalous places are detected from the inspection image.

Figure 8:
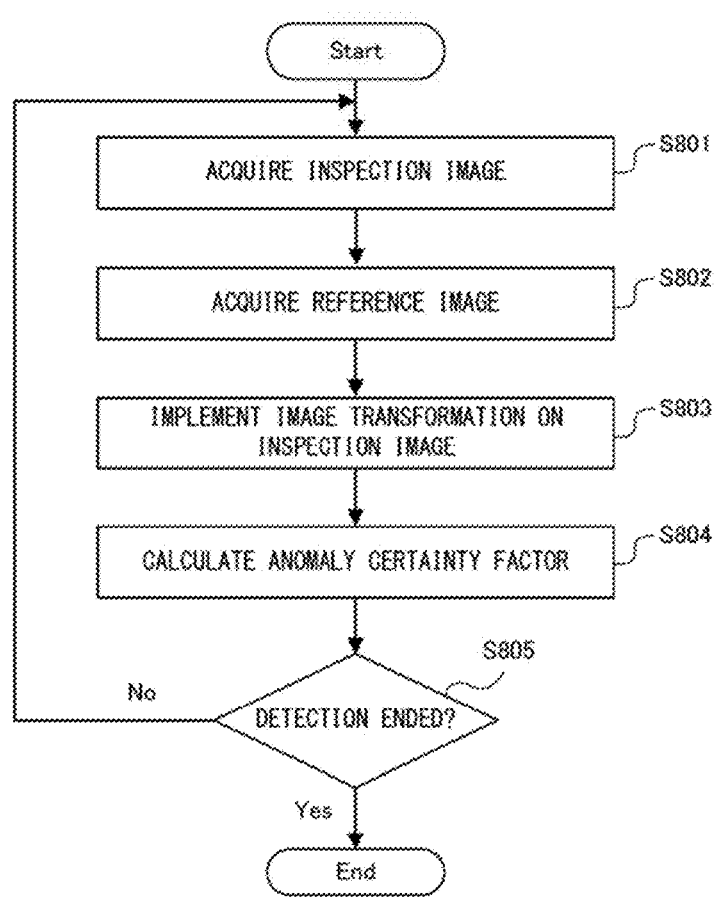
FIG. 8 is a flowchart showing operations in an anomaly detection mode by the anomaly detection apparatus according to the first example embodiment of the invention.

As shown in FIG. 8, the inspection image input unit 101 acquires an inspection image, and inputs the acquired inspection image to the image transformation unit 103 (step S801). Next, the reference image input unit 102 acquires a reference image, and inputs the acquired reference image to the image transformation unit 103 (step S802).

Next, the image transformation unit 103 calculates the transformation parameter, using the inspection image acquired in step S801, the reference image acquired in step S802, and the parameter for transformation parameter calculation. The image transformation unit 103 then executes image transformation on the inspection image based on the calculated transformation parameter (step S803). A transformed inspection image is thereby generated.

Next, the image change detection unit 104 collates the transformed inspection image generated in step S803 with the reference image acquired in step S802, using the change detection parameter, and calculates an anomaly certainty factor for every specific region (specifically, every pixel) (step S804). Also, the image change detection unit 104 displays the calculated anomaly certainty factors on the screen of a display device or the like. The user of the anomaly detection apparatus 100 is thereby able to check whether an anomaly has occurred in the inspection object.

Thereafter, the image change detection unit 104 determines whether the detection processing has ended (step S805). If the result of the determination of step S805 indicates that the detection processing has not ended, step S801 is executed again. On the other hand, if the result of the determination of step S805 indicates that the detection processing has ended, the anomaly detection mode ends.

Effects of First Example Embodiment

In this way, change that occurs in the inspection object can be sensitively detected, by adopting the configuration described in the first example embodiment. This is because the parameter for transformation parameter calculation in the image transformation unit 103 that is located upstream is corrected, such that the difference between the output of the image change detection unit 104 and the training image decreases, and, as a result, a parameter for transformation parameter calculation suitable for change detection is learned. That is, according to the first example embodiment, image transformation suitable for change detection is realized.

Also, in the abovementioned example, the anomaly certainty factor is defined as being one for every pixel or every small region, but, in the first example embodiment, an anomaly certainty factor defined for every label indicating a type of anomaly may be used, instead of the abovementioned anomaly certainty factor. For example, assuming two types of labels, namely normal and anomalous, two certainty factors are defined for every pixel or every small region, and, if normal, the certainty factor for the normal label is set to 1 and the anomaly certainty factor for the anomalous label is set to 0. If anomalous, the certainty factor for the normal label may be set to 0 and the anomaly certainty factor for the anomalous label may be set to 1. Also, three types of labels, namely, normal, anomalous, and beyond consideration, may be assumed.

Program

A program according to the first example embodiment need only be a program that causes a computer to execute steps S701 to S709 shown in FIG. 7 and steps S801 to S805 shown in FIG. 8. The anomaly detection apparatus 100 and the anomaly detection method according to the first example embodiment can be realized, by this program being installing on a computer and executed. In this case, a processor of the computer performs processing, while functioning as the inspection image input unit 101, the reference image input unit 102, the image transformation unit 103, the image change detection unit 104, the training image input unit 105, the change detection parameter learning unit 106, the correction amount calculation unit 107, and the image transformation parameter learning unit 108.

Also, programs according to this example embodiment may be executed by a computer system constructed from a plurality of computers. In this case, for example, the computers may respectively function as one of the inspection image input unit 101, the reference image input unit 102, the image transformation unit 103, the image change detection unit 104, the training image input unit 105, the change detection parameter learning unit 106, the correction amount calculation unit 107, and the image transformation parameter learning unit 108.

Second Example Embodiment

Next, an anomaly detection apparatus, an anomaly detection method and a program according to a second example embodiment of the invention will be described, with reference to FIGS. 9 and 10.

[Apparatus Configuration]

Initially, a configuration of the anomaly detection apparatus according to the second example embodiment will be described using FIG. 9. FIG. 9 is a block diagram showing a specific configuration of the anomaly detection apparatus according to the second example embodiment of the invention.

In the abovementioned first example embodiment, only a label image indicating a correct answer value of an anomalous region in the coordinate system of the reference image is used as a training image for learning, whereas, in the second example embodiment, an ideally transformed inspection image is, furthermore, also used.

Figure 9:
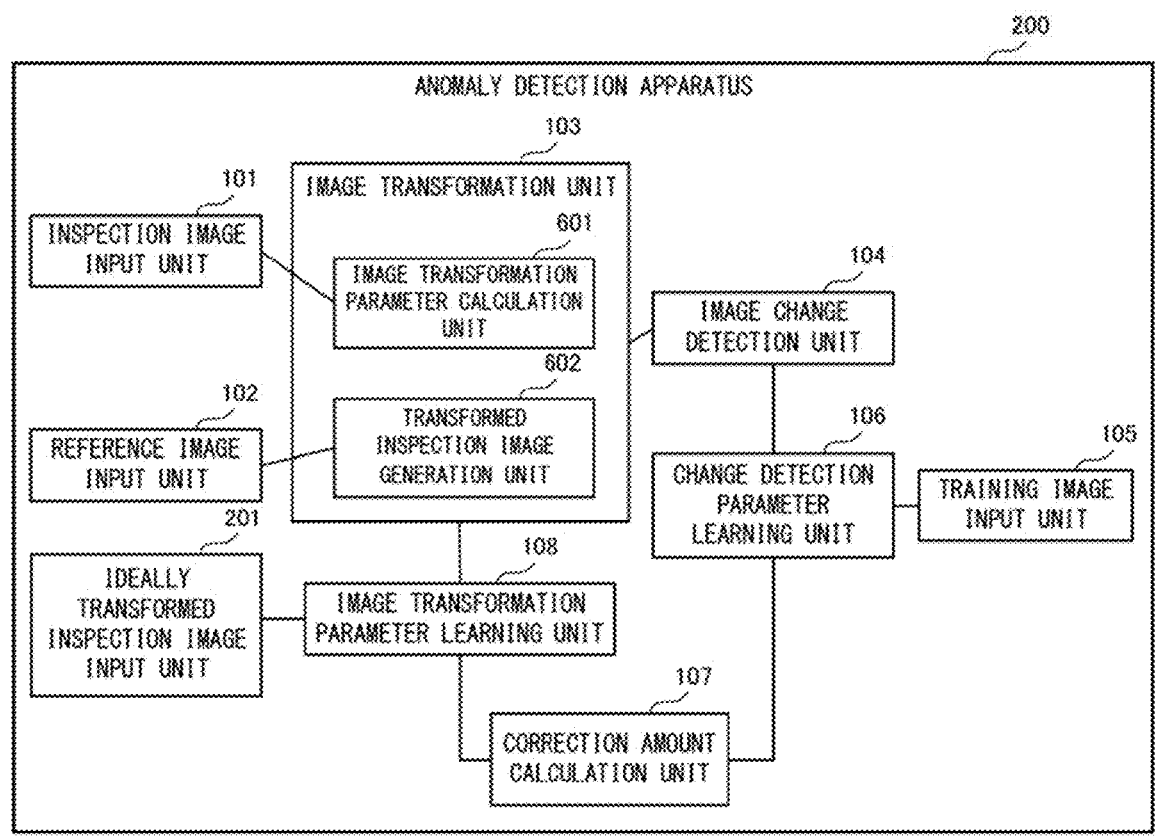
FIG. 9 is a block diagram showing a specific configuration of the anomaly detection apparatus according to a second example embodiment of the invention.

Thus, as shown in FIG. 9, an anomaly detection apparatus 200 according to the second example embodiment is provided with an ideally transformed inspection image input unit 201. The ideally transformed inspection image input unit 201 acquires an inspection image obtained in the case where ideal transformation is performed (hereinafter "ideally transformed inspection image") that corresponds to a group of an inspection image and reference image for learning, and inputs this ideally transformed inspection image to the image transformation parameter learning unit 108.

Also, the "ideally transformed inspection image" is an inspection image obtained through image transformation performed in advance such that the position and orientation of the inspection object coincides with the position and orientation of the inspection object in the reference image.

Furthermore, in the second example embodiment, the functions of the image transformation parameter learning unit 108 and the operation in the learning mode differ from the first example embodiment, due to the abovementioned configuration. Note that the second example embodiment is otherwise similar to the first example embodiment. Hereinafter, differences from the first example embodiment will be described in detail.

The image transformation parameter learning unit 108, in the second example embodiment, executes the learning mode in two steps consisting of a first step and a second step. The image transformation parameter learning unit 108 executes the processing described in the first example embodiment in the second step of the learning mode.

On the other hand, in the first step of the learning mode, the image transformation parameter learning unit 108 first derives the difference between the transformed inspection image that is output by the image transformation unit 103 and the ideally transformed inspection image input from the ideally transformed inspection image input unit 201. Next, the image transformation parameter learning unit 108 derives the image transformation parameter, based on the derived difference.

Thereafter, the image transformation parameter learning unit 108 derives a parameter for image transformation parameter calculation capable of obtaining the derived image transformation parameter, and stores the derived parameter for image transformation parameter calculation in the image transformation unit 103.

Also, in the second example embodiment, the ideally transformed inspection image input unit 201 is able to derive the amount of movement along the x-axis and y-axis from the reference image to the ideally transformed inspection image for every corresponding point (e.g., every corresponding pixel) between the ideally transformed inspection image and the reference image. Note that this movement amount is denoted as a first movement amount.

Furthermore, in the second example embodiment, the image transformation unit 103, in the learning mode, is able to derive the amount of movement from the reference image to the image-transformed inspection image, for every corresponding point (e.g., every corresponding pixel) between the image-transformed inspection image and the reference image. Note that this movement amount is denoted as a second movement amount.

In this case, the image transformation parameter learning unit 108 derives the difference between the first movement amount and the second movement amount, for every common corresponding point (every pixel), and, furthermore, updates the parameter for image transformation parameter calculation such that the sum (weighted sum) of derived differences decreases.

Apparatus Operations

Next, the operations of the anomaly detection apparatus 200 according to the second example embodiment of the invention will be described using FIG. 10. In the following description, FIG. 9 is taken into consideration as appropriate. Also, in the second example embodiment, the anomaly detection method is implemented by operating the anomaly detection apparatus 200. Therefore, the following description of the operations of the anomaly detection apparatus 200 is given in place of a description of the anomaly detection method according to the second example embodiment.

Also, in the second example embodiment, processing in the anomaly detection mode is similar to the first example embodiment. Thus, hereinafter, the learning mode will be described with reference to FIG. 10. FIG. 10 is a flowchart showing operations in the learning mode by the anomaly detection apparatus according to the second example embodiment of the invention.

Figure 10:
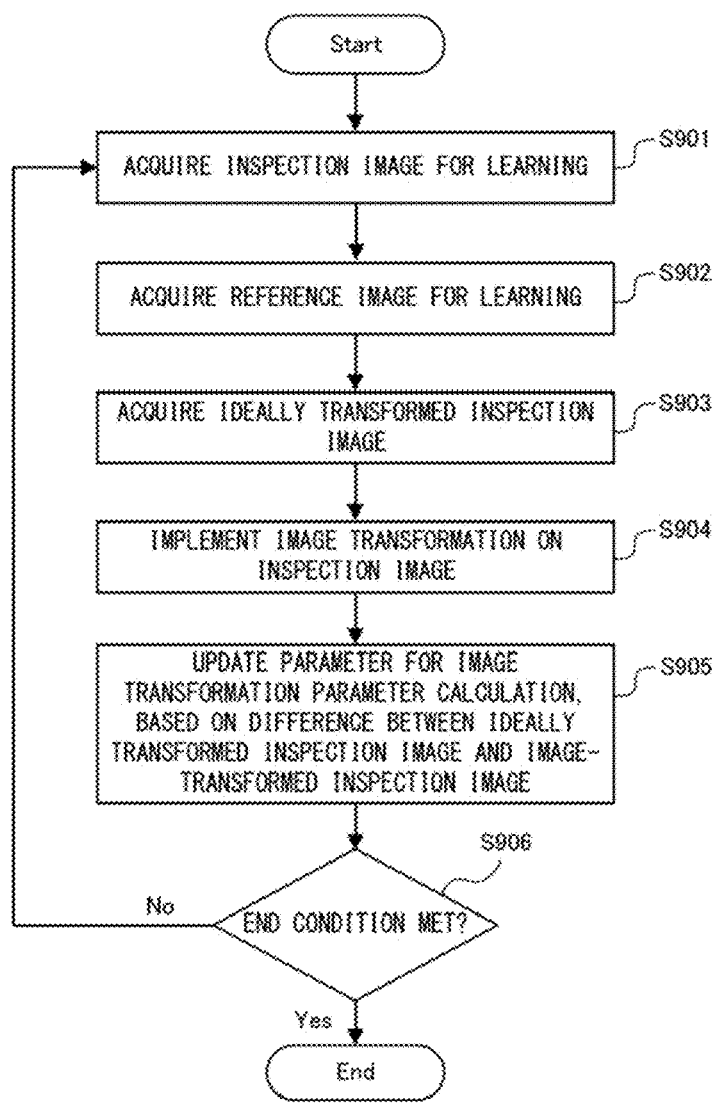
FIG. 10 is a flowchart showing operations in a learning mode by the anomaly detection apparatus according to the second example embodiment of the invention.

As shown in FIG. 10, first, in order to execute the first step of the learning mode, the inspection image input unit 101 acquires an inspection image for learning, and inputs the acquired inspection image to the image transformation unit 103 (step S901). Next, the reference image input unit 102 acquires a reference image for learning, and inputs the acquired reference image to the image transformation unit 103 (step S902).

Next, the ideally transformed inspection image input unit 201 acquires the ideally transformed inspection image, and inputs the acquired ideally transformed inspection image to the image transformation parameter learning unit 108 (step S903). Also, in step S903, the ideally transformed inspection image input unit 201, for each pixel constituting the ideally transformed inspection image, loads the x-coordinate and y-coordinate of a pixel of the reference image corresponding thereto, and calculates the first movement amount from the reference image to the ideally transformed inspection image.

Next, the image transformation unit 103 calculates a transformation parameter, using the inspection image for learning, the reference image for learning and the parameter for transformation parameter calculation that is currently held, and, furthermore, executes image transformation on the inspection image for learning, based on the calculated transformation parameter (step S904). Also, in step S904, the image transformation unit 103 calculates the second movement amount from the reference image to the transformed inspection image, for each pixel of the transformed inspection image.

Next, the image transformation parameter learning unit 108 derives the difference between the ideally transformed inspection image acquired in step S903 and the image-transformed inspection image generated in step S904, and updates the parameter for image transformation parameter calculation such that the derived difference decreases (step S905).

Specifically, in step S904, the image transformation parameter learning unit 108 derives the difference between the first movement amount and the second movement amount for every pixel, calculates an image transformation parameter using a back propagation method or the like, such that the derived difference decreases, and updates the parameter for image transformation parameter calculation, such that the calculated image transformation parameter is obtained. Thereafter, the image transformation unit 103 stores the updated parameter for image transformation parameter calculation.

Next, the image transformation parameter learning unit 108 determines whether an end condition is met (step S906). Note that the processing of steps S901 to S905 being executed a predetermined number of times and the total of the errors (differences) for all learning patterns being less than or equal to a predetermined threshold or the like are given as an example of an end condition in this case.

If the result of the determination of step S905 indicates that the end condition is not met, step S901 is executed again. On the other hand, if the result of the determination of step S905 indicates that an end condition is met, the processing ends. Thereafter, in the anomaly detection apparatus 200, the processing from steps S701 to S708 shown in FIG. 7 in the first example embodiment is executed, as the second step of the learning mode.

Effects of Second Example Embodiment

In this way, according to the configuration described in the second example embodiment, compared with the first example embodiment, learning of the image transformation parameter can be actively advanced in the first step of the learning mode, and the image transformation parameter can be learned faster. In addition, after alignment of the inspection image and the reference image has been performed comparatively favorably, learning of the change detection parameter and adaptive learning towards image change detection of an image transformation parameter are performed in the second step of the learning mode. Thus, according to the second example embodiment, the time taken in the second half of learning can be shortened, and it becomes possible to accelerate the learning processing.

Variation 1

In the second example embodiment, a mode may be adopted in which the learning mode is not divided into two steps. In this mode, learning in the learning mode is performed end-to-end, similarly to the mode shown in FIG. 7 in the first example embodiment. Also, in this case, the following two types (a) and (b) can be calculated as the difference.

(a) Sum of differences between the x-coordinate and y-coordinate for every pixel of the image-transformed inspection image that is output by the image transformation unit 103 and the correct answer values of the x-coordinate and y-coordinate for every pixel of the ideally transformed inspection image.

(b) Sum of square errors between the anomaly certainty factor that is calculated by the image change detection unit 104 and the ideal anomaly certainty factor that is input as the training image.

Thus, in the second example embodiment, a mode may be adopted in which the sums of differences (a) and (b) are weighted, and both the change detection parameter learning unit 106 and the image transformation parameter learning unit 108 correct the parameters, so as to decrease the total value of the weighted sums of differences.

Variation 2

Also, in the second example embodiment, two types of systems are conceivable as the anomaly detection mode. One system involves operating the ideally transformed inspection image input unit 201 only at the time of the learning mode, and not performing input from the ideally transformed inspection image input unit 201 at the time of the anomaly detection mode. According to this system, it is possible to detect anomalies as long as an inspection image and a reference image are input.

The other system, similarly to the time of the learning mode, involves the ideally transformed inspection image from the ideally transformed inspection image input unit 201 being utilized in the computational operations of the image transformation unit 103 and the image change detection unit 104, even at the time of the anomaly detection mode. According to this system, anomalies can be even more reliably detected, because more appropriate image transformation can be performed by the image transformation unit 103 with the same substance as the first step of the learning mode.

Variation 3

In the abovementioned example, an inspection image in which pixel positions of the inspection object have been transformed into pixel positions of the inspection object in the reference image is used as the ideally transformed inspection image. In the second example embodiment, however, the x-coordinate and y-coordinate of each corresponding point (point pair) with the inspection image in the ideally transformed inspection image may be used as the ideally transformed inspection image.

Also, in this case, the image transformation parameter learning unit 108 derives the difference between the amount of movement of a pixel that is based on the image transformation parameter output by the image transformation parameter calculation unit 601 and the amount of movement of each corresponding point calculated from the x-coordinate and y-coordinate of the corresponding point. The image transformation parameter learning unit 108 then updates and learns the parameter for image transformation parameter calculation, such that the sum of the differences for every corresponding point that is derived decreases.

Also, in the case where the x-coordinate and y-coordinate of each corresponding point (point pair) with the inspection image in the ideally transformed inspection image are used as the ideally transformed inspection image, the functions of the image transformation unit 103 and the image transformation parameter learning unit 108 will be as follows.

In the image transformation unit 103, the image transformation parameter calculation unit 601 calculates the x-coordinate and y-coordinate of a predetermined number of feature points from the inspection image and the reference image, respectively. At this time, feature points are extracted in corresponding pairs.

Also, the computational operation for calculating the x-coordinate and y-coordinate of feature points is assumed to partially differentiable with respect to movement in the x-axis direction and the y-axis direction. The transformed inspection image generation unit 602 performs image transformation on the inspection image, using an algorithm for nonlinear image transformation of the control point base such as a thin plate spline method, based on information of the feature points that are paired, and outputs an image-transformed inspection image.

The image transformation parameter learning unit 108, in the first step of learning, updates and learns the parameter for image transformation parameter calculation, such that the x-coordinate and the y-coordinate of corresponding point pairs input from the ideally transformed inspection image input unit 201 are respectively output.

Also, the image transformation parameter learning unit 108, in the second step of learning, weights the sums of differences (a) and (b), similarly to the abovementioned variation 1, and causes both the change detection parameter learning unit 106 and the image transformation parameter learning unit 108 to correct the parameters, such that the total value of the weighted sums of differences decreases Program A program according to the second example embodiment need only be a program that causes a computer to execute steps S901 to S906 shown in FIG. 10 and steps S801 to S805 shown in FIG. 8. The anomaly detection apparatus 200 and the anomaly detection method according to the second example embodiment can be realized, by this program being installed on a computer and executed. In this case, a processor of the computer performs processing, while functioning as the inspection image input unit 101, the reference image input unit 102, the image transformation unit 103, the image change detection unit 104, the training image input unit 105, the change detection parameter learning unit 106, the correction amount calculation unit 107, the image transformation parameter learning unit 108, and the ideally transformed inspection image input unit 201.

Also, programs according to this example embodiment may be executed by a computer system constructed from a plurality of computers. In this case, for example, the computers may respectively function as one of the inspection image input unit 101, the reference image input unit 102, the image transformation unit 103, the image change detection unit 104, the training image input unit 105, the change detection parameter learning unit 106, the correction amount calculation unit 107, the image transformation parameter learning unit 108, and and the ideally transformed inspection image input unit 201.

Physical Configuration

Figure 11:
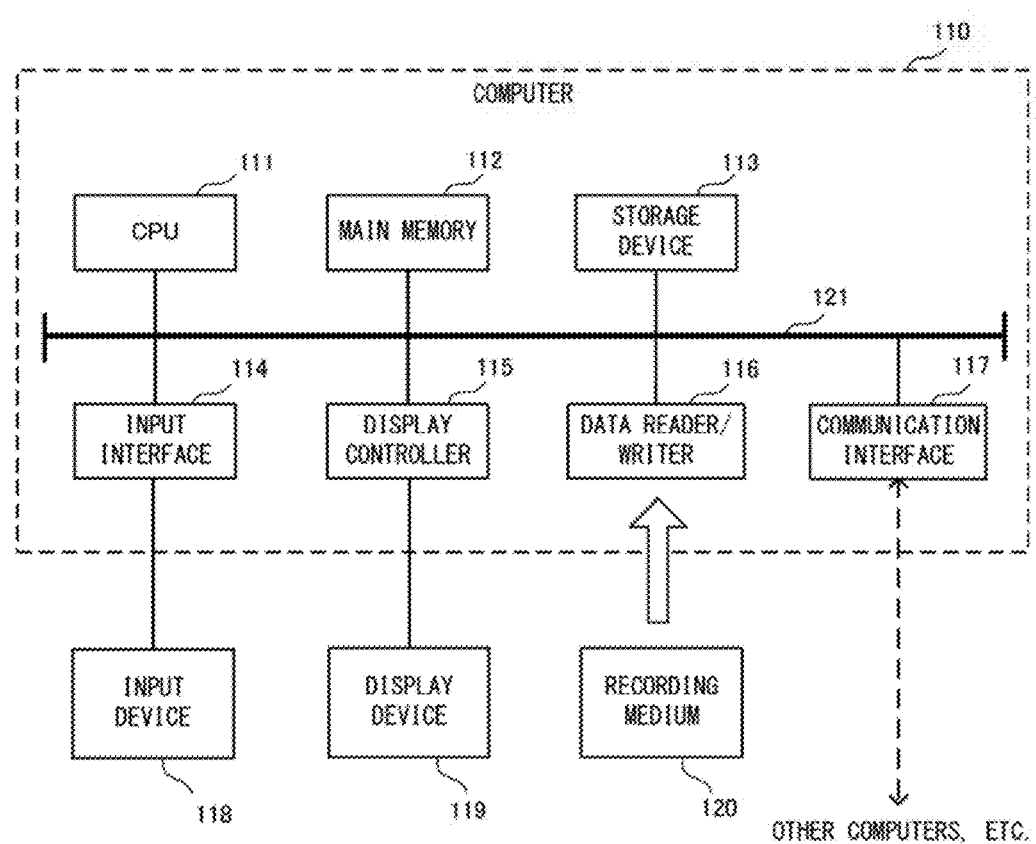
FIG. 11 is a block diagram showing an example of a computer that realizes the anomaly detection apparatus according to the first and second example embodiments of the invention.

Here, a computer that realizes an anomaly detection apparatus by executing programs according to the first and second example embodiments will be described using FIG. 11. FIG. 11 is a block diagram showing an example of a computer that realizes the anomaly detection apparatus according to the first and second example embodiments of the invention.

As shown in FIG. 11, a computer 110 is provided with a CPU 111, a main memory 112, a storage device 113, an input interface 114, a display controller 115, a data reader/writer 116, and a communication interface 117. These units are connected to each other in a data communicable manner, via a bus 121.

The CPU 111 implements various computational operations, by expanding programs (codes) according to this example embodiment stored in the storage device 113 in the main memory 112, and executing these codes in predetermined order. The main memory 112, typically, is a volatile storage device such as a DRAM (Dynamic Random Access Memory). Also, programs according to this example embodiment are provided in a state of being stored on a computer-readable recording medium 120. Note that programs according to this example embodiment may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to the display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory) are given as specific examples of the recording medium 120.

Note that the anomaly detection apparatus according to the first and second example embodiments is also realizable by using hardware corresponding to the respective units, rather than by a computer on which programs are installed. Furthermore, the anomaly detection apparatus may be realized in part by programs, and the remainder may be realized by hardware.

The example embodiments described above can be partially or wholly realized by supplementary notes 1 to 12 described below, but the invention is not limited to the following description.

Supplementary Note 1

An anomaly detection apparatus for detecting an anomaly in an inspection object, using an inspection image in which the inspection object appears and a reference image showing a normal state of the inspection object, the apparatus comprising:

an image transformation unit configured to calculate an image transformation parameter, based on the inspection image, the reference image and a parameter for image transformation parameter calculation, and perform image transformation on the inspection image, using the calculated image transformation parameter, such that the inspection object in the inspection image overlaps with the inspection object in the reference image;

an image change detection unit configured to collate the reference image and the inspection image that has undergone image transformation, using a change detection parameter, and calculate an anomaly certainty factor indicating whether there is a change in a specific region of the inspection image;

a change detection parameter learning unit configured to learn the change detection parameter, based on a difference between a training image indicating a correct answer value of the change in the specific region and the anomaly certainty factor calculated by the image change detection unit; and an image transformation parameter learning unit configured to learn the parameter for image transformation parameter calculation, based on a correction amount derived from the difference between the training image and the anomaly certainty factor calculated by the image change detection unit and to be applied to the inspection image that has undergone image transformation.

Supplementary Note 2

The anomaly detection apparatus according to supplementary note 1, in which the change detection parameter learning unit derives the difference between the training image and the anomaly certainty factor, and learns the change detection parameter by updating a value of the change detection parameter such that the derived difference decreases, the anomaly detection apparatus further includes a correction amount calculation unit configured to calculate the correction amount to be applied to the inspection image that has undergone image transformation, such that the difference between the training image and the anomaly certainty factor calculated by the image change detection unit decreases, and the image transformation parameter learning unit learns the parameter for image transformation parameter calculation, by updating the parameter for image transformation parameter calculation, such that image transformation that produces the correction amount calculated by the correction amount calculation unit is performed.

Supplementary note 3

The anomaly detection apparatus according to supplementary note 2, further including:

an input unit configured to input an inspection image created in advance and obtained in a case where the image transformation is ideally performed to the image transformation parameter learning unit, in which the image transformation parameter learning unit derives a difference between the inspection image obtained in the case where the ideal image transformation is performed and the inspection image that has undergone image transformation by the image transformation unit, and updates the parameter for image transformation parameter calculation, such that the derived difference decreases.

Supplementary Note 4

The anomaly detection apparatus according to supplementary note 3, in which the input unit derives, for every corresponding point between the inspection image obtained in the case where the ideal image transformation is performed and the reference image, a first movement amount from the reference image to the inspection image obtained in the case where the ideal image transformation is performed, the image transformation unit derives, for every corresponding point between the image-transformed inspection image and the reference image, a second movement amount from the reference image to the image-transformed inspection image, and the image transformation parameter learning unit derives a difference between the first movement amount and the second movement amount for every common corresponding point, and updates the parameter for image transformation parameter calculation such that a sum of the derived differences decreases.

Supplementary note 5

An anomaly detection method for detecting an anomaly in an inspection object, using an inspection image in which the inspection object appears and a reference image showing a normal state of the inspection object, the method including:

(a) a step of calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

(b) a step of collating the reference image and the inspection image that has undergone image transformation, using a change detection parameter, and calculating an anomaly certainty factor indicating whether there is a change in a specific region of the inspection image;

(c) a step of learning the change detection parameter, based on a difference between a training image indicating a correct answer value of the change in the specific region and the anomaly certainty factor calculated in the (b) step; and (d) a step of learning the parameter for image transformation parameter calculation, based on a correction amount derived from the difference between the training image and the anomaly certainty factor calculated in the (b) step and to be applied to the inspection image that has undergone image transformation.

Supplementary Note 6

The anomaly detection method according to supplementary note 5, in which, in the (c) step, the difference between the training image and the anomaly certainty factor is derived, and the change detection parameter is learned by updating a value of the change detection parameter such that the derived difference decreases, the anomaly detection method further includes (e) a step of calculating the correction amount to be applied to the inspection image that has undergone image transformation, such that the difference between the training image and the anomaly certainty factor calculated in the (b) step decreases, and in the (d) step, the parameter for image transformation parameter calculation is learned, by updating the parameter for image transformation parameter calculation, such that image transformation that produces the correction amount calculated in the (e) step is performed.

Supplementary note 7

The anomaly detection method according to supplementary note 6, further including:

(f) a step of inputting an inspection image created in advance and obtained in a case where the image transformation is ideally performed; and (g) a step of deriving a difference between the inspection image obtained in the case where the ideal image transformation is performed and the inspection image that has undergone image transformation in the (a) step, and updating the parameter for image transformation parameter calculation, such that the derived difference decreases.

Supplementary Note 8

The anomaly detection method according to supplementary note 7, further including:

(h) a step of deriving, for every corresponding point between the inspection image obtained in the case where the ideal image transformation is performed and the reference image, a first movement amount from the reference image to the inspection image obtained in the case where the ideal image transformation is performed; and (i) a step of deriving, for every corresponding point between the image-transformed inspection image and the reference image, a second movement amount from the reference image to the image-transformed inspection image, in which, in the (g) step, a difference between the first movement amount and the second movement amount is derived for every common corresponding point, and the parameter for image transformation parameter calculation is updated such that a sum of the derived differences decreases.

Supplementary note 9

A computer-readable recording medium that includes a program recorded thereon for detecting, by computer, an anomaly in an inspection object, using an inspection image in which the inspection object appears and a reference image showing a normal state of the inspection object, the program including instructions that cause the computer to carry out:

(a) a step of calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

(b) a step of collating the reference image and the inspection image that has undergone image transformation, using a change detection parameter, and calculating an anomaly certainty factor indicating whether there is a change in a specific region of the inspection image;

(c) a step of learning the change detection parameter, based on a difference between a training image indicating a correct answer value of the change in the specific region and the anomaly certainty factor calculated in the (b) step; and (d) a step of learning the parameter for image transformation parameter calculation, based on a correction amount derived from the difference between the training image and the anomaly certainty factor calculated in the (b) step and to be applied to the inspection image that has undergone image transformation.

Supplementary Note 10

The computer-readable recording medium according to supplementary note 9, in which, in the (c) step, the difference between the training image and the anomaly certainty factor is derived, and the change detection parameter is learned by updating a value of the change detection parameter such that the derived difference decreases, the program further includes instructions that cause the computer to carry out (e) a step of calculating the correction amount to be applied to the inspection image that has undergone image transformation, such that the difference between the training image and the anomaly certainty factor calculated in the (b) step decreases, and in the (d) step, the parameter for image transformation parameter calculation is learned, by updating the parameter for image transformation parameter calculation, such that image transformation that produces the correction amount calculated in the (e) step is performed.

Supplementary note 11

The computer-readable recording medium according to supplementary note 10, in which the program further includes instructions that cause the computer to carry out:

(f) a step of inputting an inspection image created in advance and obtained in a case where the image transformation is ideally performed; and (g) a step of deriving a difference between the inspection image obtained in the case where the ideal image transformation is performed and the inspection image that has undergone image transformation in the (a) step, and updating the parameter for image transformation parameter calculation, such that the derived difference decreases.

Supplementary Note 12

The computer-readable recording medium according to supplementary note 11, in which the program further includes instructions that cause the computer to carry out:

(h) a step of deriving, for every corresponding point between the inspection image obtained in the case where the ideal image transformation is performed and the reference image, a first movement amount from the reference image to the inspection image obtained in the case where the ideal image transformation is performed; and (i) a step of deriving, for every corresponding point between the image-transformed inspection image and the reference image, a second movement amount from the reference image to the image-transformed inspection image, in which, in the (g) step, a difference between the first movement amount and the second movement amount is derived for every common corresponding point, and the parameter for image transformation parameter calculation is updated such that a sum of the derived differences decreases.

Although the invention of the present application has been described above with reference to example embodiments, the invention is not limited to the example embodiments described above. Various modifications apparent to those skilled in the art can be made to the configuration and details of the invention within the scope of the invention.

INDUSTRIAL APPLICABILITY

According to the invention as described above, highly accurate anomaly detection becomes possible by simultaneously optimizing a parameter for image transformation suitable for anomaly detection and a parameter for identifying whether an image that has undergone image transformation is anomalous or normal. The invention is useful in fields in which anomaly detection using images is required, such as the field of quality control, for example.

LIST OF REFERENCE SIGNS

100 Anomaly detection apparatus
101 Inspection image input unit
102 Reference image input unit
103 Image transformation unit
104 Image change detection unit
105 Training image input unit
106 Change detection parameter learning unit
107 Correction amount calculation unit
108 Image transformation parameter learning unit
110 Computer
111 CPU
112 Main memory
113 Storage device
114 Input interface
115 Display controller
116 Data reader/writer
117 Communication interface
118 Input device
119 Display device
120 Recording medium
121 Bus
200 Anomaly detection apparatus (second example embodiment)
201 Ideally transformed inspection image input unit
301 Component
302 Flaw
501 Portion where anomaly has occurred
601 Image transformation parameter calculation unit
602 Transformed inspection image generation unit

The invention claimed is:

1. An anomaly detection apparatus for detecting an anomaly in an inspection object, using an inspection image in which the inspection object appears and a reference image showing a normal state of the inspection object, the apparatus comprising:

an image transformation unit configured to calculate an image transformation parameter, based on the inspection image, the reference image and a parameter for image transformation parameter calculation, and perform image transformation on the inspection image, using the calculated image transformation parameter, such that the inspection object in the inspection image overlaps with the inspection object in the reference image;

an image change detection unit configured to collate the reference image and the inspection image that has undergone image transformation, using a change detection parameter, and calculate an anomaly certainty factor indicating whether there is a change in a specific region of the inspection image;

a change detection parameter learning unit configured to learn the change detection parameter, based on a difference between a training image indicating a correct answer value of the change in the specific region and the anomaly certainty factor calculated by the image change detection unit; and an image transformation parameter learning unit configured to learn the parameter for image transformation parameter calculation, based on a correction amount derived from the difference between the training image and the anomaly certainty factor calculated by the image change detection unit and to be applied to the inspection image that has undergone image transformation.

2. The anomaly detection apparatus according to claim 1, wherein the change detection parameter learning unit derives the difference between the training image and the anomaly certainty factor, and learns the change detection parameter by updating a value of the change detection parameter such that the derived difference decreases, the anomaly detection apparatus further comprises a correction amount calculation unit configured to calculate the correction amount to be applied to the inspection image that has undergone image transformation, such that the difference between the training image and the anomaly certainty factor calculated by the image change detection unit decreases, and the image transformation parameter learning unit learns the parameter for image transformation parameter calculation, by updating the parameter for image transformation parameter calculation, such that image transformation that produces the correction amount calculated by the correction amount calculation unit is performed.

3. The anomaly detection apparatus according to claim 2, further comprising:

an input unit configured to input an inspection image created in advance and obtained in a case where the image transformation is ideally performed to the image transformation parameter learning unit, wherein the image transformation parameter learning unit derives a difference between the inspection image obtained in the case where the ideal image transformation is performed and the inspection image that has undergone image transformation by the image transformation unit, and updates the parameter for image transformation parameter calculation, such that the derived difference decreases.

4. The anomaly detection apparatus according to claim 3, wherein the input unit derives, for every corresponding point between the inspection image obtained in the case where the ideal image transformation is performed and the reference image, a first movement amount from the reference image to the inspection image obtained in the case where the ideal image transformation is performed, the image transformation unit derives, for every corresponding point between the image-transformed inspection image and the reference image, a second movement amount from the reference image to the image-transformed inspection image, and the image transformation parameter learning unit derives a difference between the first movement amount and the second movement amount for every common corresponding point, and updates the parameter for image transformation parameter calculation such that a sum of the derived differences decreases.

5. An anomaly detection method for detecting an anomaly in an inspection object, using an inspection image in which the inspection object appears and a reference image showing a normal state of the inspection object, the method comprising:

a calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

a collating the reference image and the inspection image that has undergone image transformation, using a change detection parameter, and calculating an anomaly certainty factor indicating whether there is a change in a specific region of the inspection image;

a learning the change detection parameter, based on a difference between a training image indicating a correct answer value of the change in the specific region and the anomaly certainty factor calculated in the collating; and a learning the parameter for image transformation parameter calculation, based on a correction amount derived from the difference between the training image and the anomaly certainty factor calculated in the (b) step and to be applied to the inspection image that has undergone image transformation.

6. A non-transitory computer-readable recording medium that includes a program recorded thereon for detecting, by computer, an anomaly in an inspection object, using an inspection image in which the inspection object appears and a reference image showing a normal state of the inspection object, the program including instructions that cause the computer to carry out:

a calculating an image transformation parameter, based on the inspection image, the reference image and a parameter for image transformation parameter calculation, and performing image transformation on the inspection image, using the calculated image transformation parameter, such that the inspection object in the inspection image overlaps with the inspection object in the reference image;

a collating the reference image and the inspection image that has undergone image transformation, using a change detection parameter, and calculating an anomaly certainty factor indicating whether there is a change in a specific region of the inspection image;

a learning the change detection parameter, based on a difference between a training image indicating a correct answer value of the change in the specific region and the anomaly certainty factor calculated in the collating; and a learning the parameter for image transformation parameter calculation, based on a correction amount derived from the difference between the training image and the anomaly certainty factor calculated in the (b) step and to be applied to the inspection image that has undergone image transformation.

7. The anomaly detection method according to claim 5, in which, in the learning, the difference between the training image and the anomaly certainty factor is derived, and the change detection parameter is learned by updating a value of the change detection parameter such that the derived difference decreases, the anomaly detection method further includes a calculating the correction amount to be applied to the inspection image that has undergone image transformation, such that the difference between the training image and the anomaly certainty factor calculated in the collating decreases, and in the learning the parameter for image transformation parameter calculation, the parameter for image transformation parameter calculation is learned, by updating the parameter for image transformation parameter calculation, such that image transformation that produces the correction amount calculated in the calculating is performed.

8. The anomaly detection method according to claim 7, further including:
an inputting an inspection image created in advance and obtained in a case where the image transformation is ideally performed, and
a deriving a difference between the inspection image obtained in the case where the ideal image transformation is performed and the inspection image that has undergone image transformation in the calculating an image transformation parameter, and updating the parameter for image transformation parameter calculation, such that the derived difference decreases.

9. The anomaly detection method according to claim 8, further including:
a deriving, for every corresponding point between the inspection image obtained in the case where the ideal image transformation is performed and the reference image, a first movement amount from the reference image to the inspection image obtained in the case where the ideal image transformation is performed; and
a deriving, for every corresponding point between the image-transformed inspection image and the reference image, a second movement amount from the reference image to the image-transformed inspection image,
in which, in the deriving the difference, a difference between the first movement amount and the second movement amount is derived for every common corresponding point, and the parameter for image transformation parameter calculation is updated such that a sum of the derived differences decreases.

10. The non-transitory computer-readable recording medium according to claim 6,
in which, in the learning the change detection parameter, the difference between the training image and the anomaly certainty factor is derived, and the change detection parameter is learned by updating a value of the change detection parameter such that the derived difference decreases,
the program further includes instructions that cause the computer to carry out (e) a step of calculating the correction amount to be applied to the inspection image that has undergone image transformation, such that the difference between the training image and the anomaly certainty factor calculated in the collating decreases, and
in the learning the parameter for image transformation parameter calculation, the parameter for image transformation parameter calculation is learned, by updating the parameter for image transformation parameter calculation, such that image transformation that produces the correction amount calculated in the calculating is performed.

11. The non-transitory computer-readable recording medium according to claim 10,
in which the program further includes instructions that cause the computer to carry out:
an inputting an inspection image created in advance and obtained in a case where the image transformation is ideally performed, and
a deriving a difference between the inspection image obtained in the case where the ideal image transformation is performed and the inspection image that has undergone image transformation in the calculating an image transformation parameter, and updating the parameter for image transformation parameter calculation, such that the derived difference decreases.

12. The non-transitory computer-readable recording medium according to claim 11,
in which the program further includes instructions that cause the computer to carry out:
a deriving, for every corresponding point between the inspection image obtained in the case where the ideal image transformation is performed and the reference image, a first movement amount from the reference image to the inspection image obtained in the case where the ideal image transformation is performed; and
a deriving, for every corresponding point between the image-transformed inspection image and the reference image, a second movement amount from the reference image to the image-transformed inspection image,
in which, in the deriving the difference, a difference between the first movement amount and the second movement amount is derived for every common corresponding point, and the parameter for image transformation parameter calculation is updated such that a sum of the derived differences decreases.

\* \* \* \* \*